(12) United States Patent
Andrade et al.

(10) Patent No.: US 8,904,366 B2
(45) Date of Patent: Dec. 2, 2014

(54) USE OF VECTORIZATION INSTRUCTION SETS

(75) Inventors: Henrique Andrade, Croton-on-Hudson, NY (US); Bugra Gedik, White Plains, NY (US); Hua Yong Wang, Beijing (CN); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1062 days.

(21) Appl. No.: 12/466,980

(22) Filed: May 15, 2009

(65) Prior Publication Data
US 2010/0293534 A1 Nov. 18, 2010

(51) Int. Cl.
*G06F 9/45* (2006.01)

(52) U.S. Cl.
CPC ............................... *G06F 8/447* (2013.01)
USPC ............ 717/146; 717/140; 717/160; 717/166

(58) Field of Classification Search
USPC ............ 717/140–160, 166, 22; 712/2, 3, 7, 9, 712/21, 22
See application file for complete search history.

(56) References Cited

U.S. PATENT DOCUMENTS

| | | | | |
|---|---|---|---|---|
| 5,046,024 A * | 9/1991 | Smith et al. | .................... | 345/440 |
| 5,175,862 A * | 12/1992 | Phelps et al. | ....................... | 712/7 |
| 6,075,935 A * | 6/2000 | Ussery et al. | .................. | 716/105 |
| 7,284,241 B2 * | 10/2007 | Heishi et al. | ................... | 717/152 |
| 7,313,788 B2 * | 12/2007 | Ben-David et al. | ............ | 717/150 |
| 7,962,906 B2 * | 6/2011 | O'Brien et al. | ................ | 717/160 |
| 2002/0026633 A1 * | 2/2002 | Koizumi et al. | .............. | 717/146 |
| 2002/0104067 A1 * | 8/2002 | Green et al. | ................... | 717/101 |
| 2006/0101438 A1 * | 5/2006 | Mariani | ......................... | 717/148 |

* cited by examiner

*Primary Examiner* — Farley Abad
*Assistant Examiner* — Getente A Yimer
(74) *Attorney, Agent, or Firm* — William Stock

(57) ABSTRACT

In one embodiment, the invention is a method and apparatus for use of vectorization instruction sets. One embodiment of a method for generating vector instructions includes receiving source code written in a high-level programming language, wherein the source code includes at least one high-level instruction that performs multiple operations on a plurality of vector operands, and compiling the high-level instruction(s) into one or more low-level instructions, wherein the low-level instructions are in an instruction set of a specific computer architecture.

25 Claims, 7 Drawing Sheets

```
template <class T>
class dlist : std::vector<T,myalloc<T>>     ⎫
{                                            ⎬ 300
                                             ⎭
  ......
  void rescale(unsigned int_n)              ⎫
  {                                          ⎬ 302
    ......                                   
  }                                          ⎭
  const dlist <T> & operator=(dlist<T>&&b)   ⎫
  {                                          ⎪
   swap(b);                                  ⎬ 304
   return * this;                            ⎪
  }                                          ⎭
  ......
};
```

FIG. 3

```
* declaration of dlist template class */

/* when T is a type of 32-bit size */
template<class T>
inline dlist<T>operate+(const dlist<T>&a, const dlist<T>&b)
{
......
for (int i = 0; i < length; i+=4)
{
__m128i a1 = *(__m128i*)(&a[i]);
__m128i b1 = *(__m128i*)(&b[i]);
__m128i c = _mm_add_epi32(a1, b1);
......
}
......
}

/* when T is a type with 8-bit size */
template<class T>
inline int SAD(const dlist<T>&a, const dlist<T>&b)
{
......
for (int i = 0; i < length; i+=16)
{
__m128i a1 = *(__m128i*)(&a[i]);
__m128i b1 = *(__m128i*)(&b[i]);
__m128i c = _mm_sad_epu8(a1, b1);
......
}
......
}
```

FIG. 4

USE OF VECTORIZATION INSTRUCTION SETS

REFERENCE TO GOVERNMENT FUNDING

This invention was made with Government support under Contract No. H98230-07-C-0383, awarded by the United States Department of Defense. The Government has certain rights in this invention.

BACKGROUND OF THE INVENTION

The invention relates generally to vector-processing heavy applications, and relates more specifically to providing transparent auto-vectorization support for such applications.

Vectorization is the process of converting a vector operation from a scalar implementation, which operates on a pair of operands (i.e., an element of each vector) at a time, to a vectorized implementation, in which a single instruction can perform multiple operations concurrently on a pair of vector operands (i.e., multiple elements of each vector) at a time. For example, given vector A and vector B, where vector A and vector B both include four elements, a vector instruction can be generated that, in a single operation, adds the first element of vector A to the first element of vector B, the second element of vector A to the second element of vector B, the third element of vector A to the third element of vector B, and the fourth element of vector A to the fourth element of vector B. Automatic vectorization is the automatic transformation of a series of operations performed sequentially (the scalar version), one operation at a time, to operations performed in parallel, several at once (the vectorized version).

High performance applications that rely on vector processing operations are present in many domains. According to conventional techniques, making use of vectorization in code development tasks can be accomplished in several ways. For example, there are three common approaches to utilizing single instruction, multiple data (SIMD)-based vectorization. One approach is to manually vectorize the code. In other words, the first approach directly makes use of the vectorization instructions wherever this is possible in the code. This can be accomplished either by inlining the assembly language instructions into the source code, or by using intrinsic functions ("intrinsics" for short), which are supported by many compilers. While the use of intrinsics helps considerably, the recoding process can still be time-consuming and tedious. In particular, less sophisticated developers usually avoid this approach because it requires non-trivial code changes. The second approach employs specialized libraries that implement common domain-specific operations (e.g., Fast Fourier Transform) required by the data processing analytics. A problem with this approach is that the libraries must be maintained and, eventually, extended to incorporate new operations as needed. The third approach employs general-purpose auto-vectorizing compilers. This is certainly the easiest on the developers, but it is only as good as the compiler's ability to identify code sites amenable to auto-vectorization transformations. Thus, conventional approaches are limited in terms of providing auto-vectorization support.

SUMMARY OF THE INVENTION

In one embodiment, the invention is a method and apparatus for use of vectorization instruction sets. One embodiment of a method for generating vector instructions includes receiving source code written in a high-level programming language, wherein the source code includes at least one high-level instruction that performs multiple operations on a plurality of vector operands, and compiling the high-level instruction(s) into one or more low-level instructions, wherein the low-level instructions are in an instruction set of a specific computer architecture.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a schematic diagram illustrating an exemplary structure and set of optimizations for the dlist class, according to the present invention;

FIG. 4 is a schematic diagram illustrating exemplary implementations of vector addition and sum of differences operations as dlist methods;

DETAILED DESCRIPTION

Figure 1:
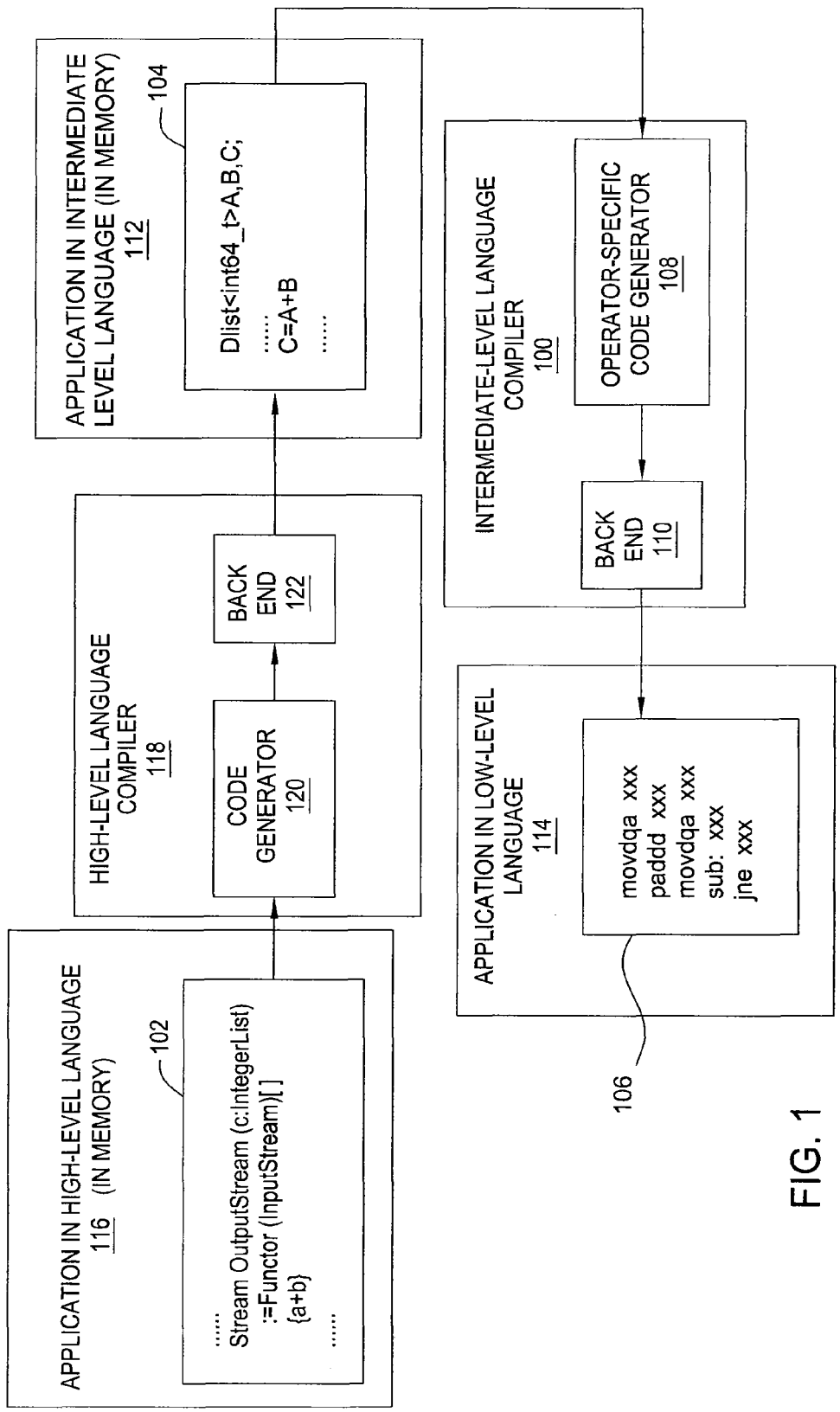
FIG. 1 is a schematic diagram illustrating the operation of one embodiment of a pair of compilers, according to the present invention.

In one embodiment, the invention is a method and apparatus for transparent use of vectorization instruction sets. Embodiments of the invention provide a templatized implementation of a vector manipulation class that is used for implementing higher-level vector manipulation operations. This approach, coupled with code generation, makes the compile-time effort to locate auto-vectorization sites in the code no longer necessary, as vectorized operations are employed implicitly by having programmers use the vector manipulation class directly.

Specifically, embodiments of the invention employ a two-tiered programming approach for making better use of SIMD instructions in the context of data processing applications. This approach is superior to directly using intrinsics, which requires application recoding. This approach is also superior to the direct use of auto-vectorization by employing the capabilities of a general purpose C or C++ programming language compiler, which may yield only limited performance benefits since such compilers are limited in their ability to recognize vectorization sites. Moreover, this approach is also superior to conventional auto-vectorization techniques. Vectorization sites are made explicit in the present invention, which implements vector operations by employing operations defined in a vector manipulation class. The operations defined in the vector manipulation class are implemented in vectorized fashion. In this way, higher-level operators implemented by programmers automatically benefit from vectorized code.

Embodiments of the invention effectively address the challenge of analytics that rely heavily on vectorized processing by employing vectorization support through the use of SIMD instructions. Language-based and code generation-based techniques in embodiments of the present invention provide access to architecture-specific vectorization support for high-performance data stream processing applications. Although embodiments of the invention are described within the exemplary context of data stream processing applications, those skilled in the art will appreciate that the concepts of the present invention are applicable to any high-level programming language or environment that is used to develop vector-processing heavy applications.

Embodiments of the present invention provide a type- and operation-generic approach that is also substantially transparent to users. This allows application writers to focus more on analytics writing and less on architecture-specific details (e.g., data transport, large-scale parallelization, application decomposition, etc.). Thus, the burden of using architecture-specific optimization lies with the compiler code generators. Moreover, embodiments of the invention use vectorization support in the programming language and in code generation in order to allow less sophisticated application developers to employ architecture-specific vectorization.

As discussed above, embodiments of the invention are described within the exemplary context of runtime support and programming models that are developed as part of a general purpose data stream processing middleware. Embodiments of this middleware employ the SPADE programming language. SPADE stands for "Stream Processing Application Declarative Engine," a programming language and compilation infrastructure specifically built for streaming systems. The SPADE programming language is a high-level programming language (i.e., a programming language that does not reflect the structure of any particular computer or operating system) that is used to implement stream processing applications. The SPADE programming model is more fully described by Gedik et al. in "SPADE: The System S Declarative Stream Processing Engine," SIGMOD Conference 2008: 1123-1134.

A facet of the SPADE programming model that is meaningful in the context of the present invention is the ability of the SPADE compiler to generate application code based on the computational capabilities of the runtime environment. This code generation approach is advantageously adapted for use with the present invention, because switching from SIMD extensions (SSE) instruction set vectorization on an Intel Corporation x86 instruction set architecture to ALTIVEC instruction set vectorization on an International Business Machines Corporation POWERPC instruction set architecture can be made substantially transparent to application writers. Likewise, if a SIMD instruction is not available, this causes the compiler to issue regular scalar code instead.

The middleware runtime can execute a large number of long-running jobs as part of one or more applications. Jobs can interact as part of a single application or a set of related applications and can take the form of data-flow graphs. A data-flow graph comprises a set of processing elements connected by data streams, where each data stream carries a series of tuples. The processing elements are containers that host operators that implement data stream analytics and are distributed on compute nodes. The compute nodes are organized as a shared-nothing cluster of workstations or as a large supercomputer. The processing elements communicate with each other via their input and output ports, which are connected by the data streams. The processing element ports, as well as the data streams, are typed, employing application-defined type systems (which are typically built by combining system-supported basic types that range from numeric types such as eight-bit integers to complex types such as lists of basic type elements). Processing elements can be explicitly connected using hard-coded links or can be implicitly connected through links that rely on properties of data streams (e.g., "streams that carry surveillance video from cameras located in Building A"). Implicit connections are dynamic (i.e., made at runtime, upon the availability of a stream that matches a subscription expression) and allow the middleware to support incremental application development and deployment.

In one embodiment, the SPADE declarative language is used to program applications for the middleware. The SPADE declarative language provides a rapid application development front-end that includes a plurality of features. One of these features is a language for flexible composition of parallel and distributed data-flow graphs. This language can be used directly by programmers, or can be used between task-specific higher level programming tools (e.g., for querying, composition of map-reduce flows, or the like) and lower-level application programming interfaces (APIs). A second feature of the SPADE declarative language is extensibility based on support for adding new toolkits of type-generic stream processing operators. A third feature of the SPADE declarative language comprises a broad range of edge adapters that are used to ingest data from external sources and to publish results to external consumers (e.g., network sockets, databases, file systems, proprietary platforms, and the like).

The SPADE programming language provides a stream-centric, operator-based programming model. The stream-centric design implies a language where the basic building block is a stream. In other words, an application writer can quickly translate the flows of data that are anticipated from a block diagram into the application framework simply by listing the stream flows. The operator-based programming is focused on designing the application by reasoning about the smallest possible building blocks necessary to deliver the computation the application is designed to perform. SPADE operators are organized in terms of domain-specific toolkits (e.g., signal processing, data mining, etc.).

Given an application specification in the SPADE programming language intermediate, a compiler generates the application code based on the computation capabilities of the runtime environment (i.e., the generated code is specialized to the runtime environment). In one embodiment, this specialization includes: (1) code fusion (i.e., the ability to translate the logical description of an application in terms of operators into a set of processing elements such that multiple operators may be placed in a single processing element and that the streams between the processing elements are converted into straight function calls); (2) vectorization (in which operations expressed in terms of vectors are translated into code that employs SIMD instructions); and (3) profiling (in which performance data collection employs the different mechanisms provided by a particular processor (i.e., hardware counters) for obtaining metrics, which are later used for optimizing the placement of operators in processing elements).

This code generation approach is advantageously adapted for use with the present invention, because one can go from a fully fused application to a fully distributed application through simple recompilation, adapting different ratios of processing to input/output provided by different computational architectures (e.g., a blade center computing architecture versus the BLUE GENE computing architecture). Likewise, switching from SIMD extensions (SSE) instruction set vectorization on an x86 instruction set architecture to ALTIVEC instruction set vectorization on a POWERPC instruction set architecture can be made substantially transparent to application writers.

FIG. 1 is a schematic diagram illustrating the operation of one embodiment of a pair of compilers 100 and 118, according to the present invention. As illustrated, the first compiler 118 comprises at least one code generator 120 and a back end 122, while the second compiler 100 also comprises at least one code generator 108 and a back end 110.

The first, high-level programming language compiler 118 receives source code 116 for an application that is written in a high-level programming language (e.g., the SPADE programming language) that employs vectorized operators. In the illustrated example, the terms "a" and "b" in the source code 116 are vectors. The source code 116 is passed to the code generator 120, which generates equivalent compiled code 112 for the application in an intermediate programming language. The intermediate programming language is a lower-level programming language relative to the high-level programming language (e.g., a general-purpose programming language, such as the C++ programming language). The equivalent intermediate-level code 112 is implemented using methods from a template-based class that implements basic vector manipulation operations, using architecture-specific intrinsics. The intermediate-level code 112 includes expanded invocations to dlist template class methods (as discussed in further detail below).

The second, intermediate-level language compiler 100 receives the intermediate-level code 112 (e.g., from the back end 122 of the first compiler 118). The intermediate-level language compiler 100 comprises at least one operator-specific code generator 108. The appropriate operator-specific code generator 108 for the intermediate-level code 112 is selected, and the intermediate-level code 112 is passed to the selected operator-specific code generator 108. The operator-specific code generator 108 generates a set of equivalent, specialized vector instructions (i.e., vectorized executable code) 106 for the application in a low-level programming language that is architecture specific (i.e., assembly language that is specific to the architecture of an intended runtime environment or machine). The low-level programming language is a lower-level programming language relative to the intermediate-level programming language. The set of vector instructions 106 includes the dlist methods that are invocated by the intermediate-level code 112 and uses SIMD instructions (e.g., SSE3 instructions). The set 106 of vector instructions is passed from the operator-specific code generator 108 to the back end 110, which then compiles the set 106 of vector instructions into compiled code 114 and outputs the compiled code 114 to the intended runtime environment.

Thus, as illustrated, the generation of the set of vector instructions 106 uses two tiers 102 and 104 of code generation to support transparent use of SIMD vectorization instructions. The first tier 102 shows the use of vector manipulation primitives in the high-level programming language (in the exemplary context of FIG. 1, the SPADE programming language), where the programming language constructs are converted into calls to the low-level library-supported dlist template class. The dlist template class is a generic vector manipulation template class or container (e.g., a C++ programming language construct). Within the field of computer programming, a template class or container is understood to refer to a holder object that stores a collection of other objects (the elements of the template class). The C++ programming language library comprises a plurality of template classes, each of which replicates a structure that is commonly used in programming, such as dynamic arrays (vector template class), queues (queue template class), linked lists (list template class), and the like.

The dlist template class replicates the double linked list structure, and embodiments of a dlist template class are used herein as a vector manipulation template class. The first tier 102 thus makes use of SIMD vectorization instructions as used by the vector manipulation methods that are part of the dlist class (as in the second tier 104). The second tier 104 shows the use of a low-level library-supported dlist template class that implements methods for vector manipulation implemented in terms of vector intrinsic that are specific to the architecture of the intended runtime environment.

Application writers can use the high-level programming language of the first tier 102 to compose a processing graph by connecting source edge adapters to specific operators that carry out the required processing for an application and, subsequently, externalize the results by employing sink edge adapters. Vectorization in this case is expressed simply by using regular operations (e.g., additions, subtractions, divisions, or multiplications) with vector operands, for example, as illustrated in FIG. 3. These operations are translated into invocations of methods of the dlist template class, which, in turn, are implemented using vectorized instructions by construction as previously discussed.

Figure 2:
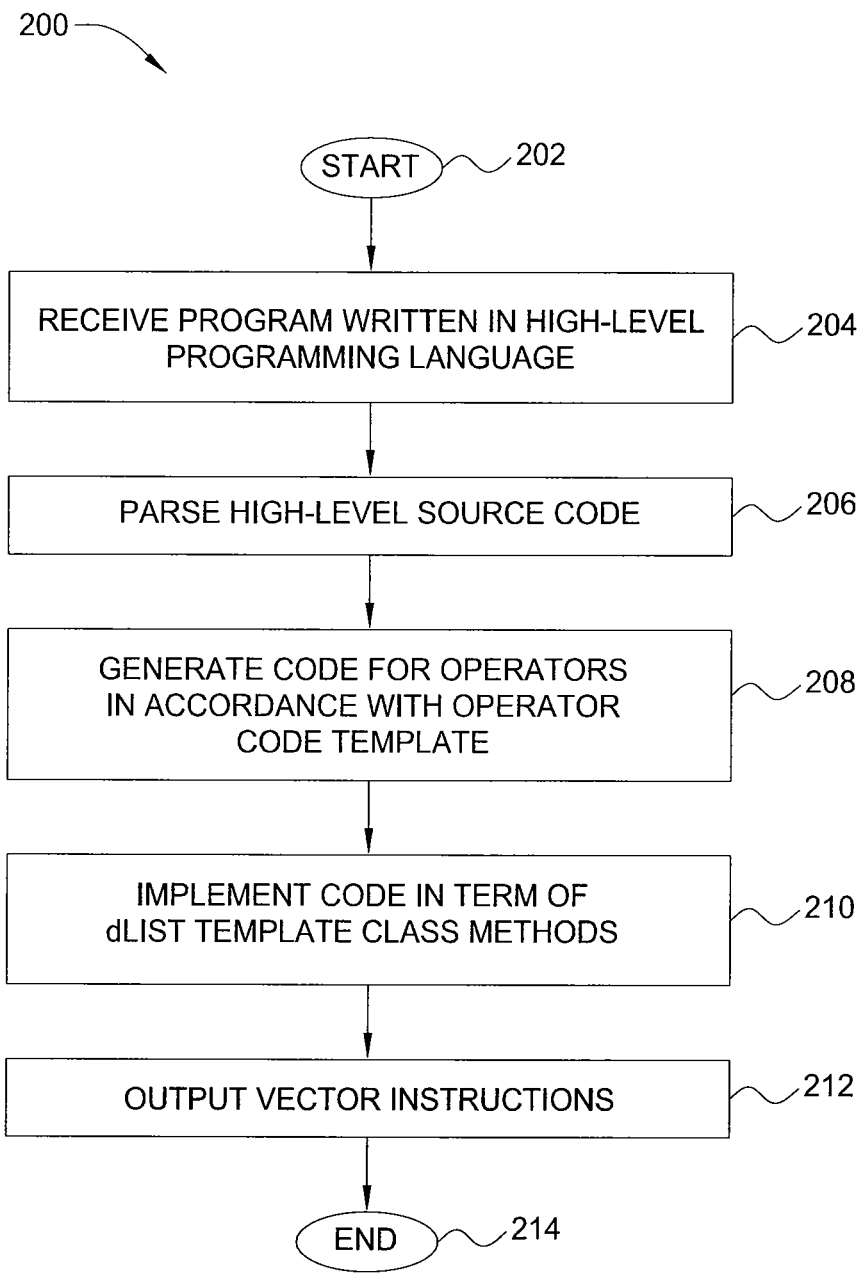
FIG. 2 is a flow diagram illustrating one embodiment of a method for generating vector instructions for vector processing code written using a high-level programming language, according to the present invention.

FIG. 2 is a flow diagram illustrating one embodiment of a method 200 for generating vector instructions for vector processing code written using a high-level programming language (i.e., code for carrying out vectorized operations), according to the present invention. This is the first programming tier of the present invention. The method 200 may be implemented, for example, by the compiler 100 illustrated in FIG. 1.

The method 200 is initialized at step 202 and proceeds to step 204, where the code generator 200 receives a program written in a high-level programming language (e.g., the SPADE programming language, or language usable by the JAVA programming language's JUST-IN-TIME (JIT) compiler or the YET ANOTHER COMPILER COMPILER (YACC), among others). In one embodiment, the program makes use of vector operations directly, similar to the exemplary program illustrated in the first tier 102 of FIG. 1.

In step 204, a parser in the code generator parses the high-level source code comprising several operators and their stream inter-connections. The method 200 then proceeds to step 206, where the code generator generates code for operators in accordance with the respective operator code template in step 204. In one embodiment, the code generator employs one or more operator templates in order to generate the code. In a further embodiment, the code generator implements the operators in terms of second tier operations, as discussed with respect to FIG. 1. In one embodiment, the code for the operators is generated in the C++ programming language.

In one embodiment, the generation of code in accordance with step 206 can be optimized to employ, for example, Intel Coporation x86 SSE3- or SSE4-based instructions, or any other vectorized versions of the dlist class. In this case, the compiler of the code generator is directed to employ a particular implementation of the dlist class (e.g., regular or vectorized), based on where the code will ultimately be deployed at runtime (e.g., a processor with SSE3 support or a processor with SSE4 support). For instance, SSE3 typically does not provide adequate support for integer multiplication. In particular, the overhead required to trim additional bits offsets the gains from vectorization. For platforms without SSE4 support, therefore, a regular implementation of the dlist class may be preferable. As a safeguard against incomplete vectorized instruction sets, non-vectorized implementations of certain operations can also be used when needed. A similar approach can also be used to generate code for other vectorized instruction sets (e.g., the ALTIVEC instruction set).

In step 208, the code generator implements the code in terms of compiler intrinsics. The code generator then outputs the vector instructions in step 210. In one embodiment, the vector instructions comprise assembler code with SSE instructions.

Thus, by implementing the method 200, the code generator can convert or transform regular vectorization operations (e.g., additions, subtractions, divisions, or multiplications), as well as calls to vector manipulation functions, into code (e.g., C++ programming language code) that employs the appropriate vectorization through use of intrinsics (when such extensions are supported by the node or processing element that will host the operator).

FIG. 3, for example, is a schematic diagram illustrating an exemplary structure and set of optimizations for the dlist class, according to the present invention. FIG. 4 is a schematic diagram illustrating exemplary implementations of vector addition and sum of differences operations as dlist methods. Specifically, the code in FIG. 4 implements the vector addition and sum of differences operations in the C++ programming language.

As illustrated in FIG. 3, the dlist class structure implementation makes use of several optimizations. These optimizations include a memory allocator 300, a rescale function 302, and a right-hand side (R)-value reference 304. The memory allocator 300 substantially ensures proper alignment of memory allocation by the dlist class. The rescale function 302 replaces a similar resize function. This reduces the overhead required to set newly allocated memory to zero, as well as the overhead required to call the destructors for the objects in the original memory space. The R-value reference 304 reduces data copy overhead.

The SPADE programming language supports vectors of several numeric types, including eight-bit, sixteen-bit, thirty-two-bit, and sixty-four bit integers, as well as single and double precision floating point numbers. An example of this approach is illustrated in the SPADE code excerpt below.

Stream ElectricFieldIntensity(seq: Long, Intensity: FloatList):=Functor(synchEfields) [ ] {seqNum( ) Ex2+Ey2+Ez2}

In this code excerpt, the FloatList type for a vector named Intensity is used. The FloatList type stores the result of the addition operation of three vector operands (Ex2, Ey2, and Ez2) that represent multiple readings of the squared value for the electric field in three dimensions. In other words, each incoming tuple carries three vectors, and the Functor operator outputs the resulting Intensity vector, as well as a sequence number used for downstream synchronization.

The second programming tier (e.g., second tier 104 of FIG. 1) supports extending the programming language by creating new operators. The SPADE programming language is fundamentally an extensible, distributed application composition language. A typical application consists of an enumeration of streams produced by a flowgraph. In such a flowgraph, each stream is the result of applying an operator that carries out a particular data transformation.

The first programming tier 102 of FIG. 1 is referred to herein as the "application composition programming tier." Most application developers typically perform the bulk of their coding in this programming tier, by employing toolkits of operators that are the building blocks for more sophisticated analytics. In this programming tier, a developer employs SPADE programming language syntax and constructs. In this context, several low-level data transformation operations can be carried out on vectors, which are elemental data types, as well as on other data types directly supported by the language.

When a SPADE application runs, it does not use any form of introspection. Instead the SPADE compiler consumes an application of the type illustrated in FIG. 3. The SPADE application support framework utilizes a very minimal runtime system that enables the creation of processing elements and their interconnection through a transport layer. These processing elements and interconnections may be deployed, for example, in an INFOSPHERE STREAMS stream processing system, commercially available from International Business Machines Corporation of Armonk, N.Y.

The actual application processing is carried out by custom-made instantiations of the operators used in the application. In other words, the SPADE compiler employs a collection of backend code generators, one per operator in the application. Each code generator is tasked with specialization of the template code associated with an operator's code generator based on the operator parameter configurations, as well as environmental configurations. Operators can be configured along several dimensions, including, but not limited to: the schema for the streams an operator is supposed to handle, windowing configurations, and uniform resource identifiers (URIs) for external data sources and sinks. These configurations are taken by the specific code generator and the equivalent, fully-expanded C++ programming language-equivalent code is generated. Likewise, environmental configurations that describe where an operator will run are considered. This information is used to specialize the generated C++ programming language code for architecture-specific features. In other words, each of the code generators issues code for employing a different type of inter-operator communication layer by employing a different transport library (e.g., to use the TORUS network on International Business Machine Corporation's BLUE GENE computing architecture or the INFINIBAND computing architectures, on a cluster of workstations) or for carrying out profiling instrumentation using hardware-specific timers and counters, among other examples. Ultimately, the C++ programming language code is automatically built using a regular off-the-shelf compiler.

This second tier, which is not normally seen by application developers, is referred to herein as the "toolkit programming tier." As discussed above, the SPADE programming language is an extensible language. New operators can be added to the language, seamlessly extending its syntax.

To support the creation of a new operator, considerable infrastructure is provided. First, the SPADE compiler libraries provide services that enable the integration of the master compiler with new backend code generators. Services include the capability of passing operator configuration parameters as well as runtime configuration parameters between the master compiler and the auxiliary code generators. The code generators themselves rely on an infrastructure that includes defining an operator model. The operator model is used to define what an operator will look like. For example, the operator model may define how many streams the operator produces, how many streams the operator consumes, what are the valid configuration parameters, what are the constraints on these parameters, what kind of windowing is supported (to batch incoming stream tuples), and the like. The operator model is used by the master compiler to perform syntax checking as it compiles an application. The master compiler also creates an operator instance (vetted against the operator model) that transports the instantiation configuration of an operator to its code generator, enabling it to issue the correct and fully specialized equivalent C++ programming language code. Each code generator is also informed about the architecture-specific configurations and can thus specialize the code accordingly.

The auto-vectorization support in the SPADE programming language is implemented at the toolkit programming tier. As discussed above, vectors are first class types in the SPADE programming language. As also discussed above, each operator code generator must produce the C++ programming language code equivalent to its usage in the SPADE program. Therefore, when an operator employs vector operations, these operations must eventually be turned into C++ programming language code. The approach described herein comprises providing a templatized class to support basic vector operations. These basic vector operations range from simple arithmetic operations with vector operands, to more specialized operations such as operating on a vector and a scalar operand (e.g., by adding them together), to vector element filtering, plus a large collection of other convenience functions.

In implementing these functions, all of the fundamental operations that have equivalent low-level SIMD instructions are implemented that way. In one embodiment, this template class (i.e., dlist) has two instantiations, a scalar instantiation which is architecture-agnostic and a vectorized instantiation which is specialized through the use of SSE intrinsics.

Thus, the dlist template class is used both for building vector-processing operators and for supporting vector processing operations stated directly in the SPADE programming language. First, compiler-specific intrinsics are employed to specialize the dlist template class for using SSE instructions. Second, the dlist template class is built as a specialized library. Third, the SPADE master compiler invokes the operator code generators with information about where an operator will run and, therefore, the code generators will pick the dlist implementation that is most suitable in that case.

A key idea in auto-vectorization is that the approach be transparent to code developers. The present invention provides this transparency at both programming tiers in the SPADE programming language. For example, when vector manipulation is carried out in the application composition programming tier by employing SPADE vector manipulation functions, the high-level code is translated into C++ programming language code, where operands eventually become dlist template class objects and operations are translated into dlist template class method invocations. These method invocations are ultimately converted by the C++ compiler into SIMD instructions. If vector manipulation is carried out in the toolkit programming tier, operator developers would already have implemented these vector manipulation operations by making use of dlist template class objects directly. This means that developers at either programming tier are not required to perform any vectorization themselves.

When a new operator is added to the SPADE programming language, the vector processing portion of the operator is implemented using dlist template class methods for carrying out the vectorized operations. In this exemplary implementation of the present invention, the process of adding new operators can employ a mixed programming mode in which certain portions of the code are written using a first programming language (e.g., the Perl programming language) and other portions of the code are written using a second programming language (e.g., the C++ programming language). In this case, the first programming language is used to customize the operator processing in terms of different stream schemas and operator parameters, and, potentially, in terms of internal processing that might include configurable vector processing. The second programming language is used to implement the actual fixed processing logic, including vectorized processing to be carried out in the context of the operator. In other words, each new programming language operator is associated with a code generator written using this mixed mode framework.

The operator customization is accomplished by employing an operator context object that the SPADE programming language parser in the code generator populates as it compiles an application. As discussed above, the operator context object stores all operator parameters employed by the SPADE programming language source code written by the application developer. The operator writing process is akin to writing Active Server Pages (ASPs), Java Server Pages (JSPs), or asynchronous JavaScript and extensible markup language (AJAX)-based web applications, where programming logic and straight hypertext markup language (HTML) are mixed by using special markers for embedding the processing code. In this way, the vector manipulation portions of the code are expressed in terms of calls to the dlist template class, regardless of whether the vector operations are fixed or variable (i.e., depending on configurations stored in the operator context object).

In this exemplary embodiment, when a SPADE programming language application that makes use of a new operator is compiled, this operator's code generator is invoked, outputting straight C++ programming language code, which in turn will make use of the SPADE programming language's runtime dlist library (as discussed above). An additional aspect of this invention is the inclusion in the code generator infrastructure of mechanisms for specializing the generated C++ programming language code depending on characteristics of the computational platform (e.g., architecture, network topology, etc.) on which the operator will run (e.g., as discussed above with respect to optimization of step 206 of the method 200). The runtime library provides the container infrastructure for running and connecting the operators, either through fusion or through the use of a suitable network transport (as expressed in the user's SPADE programming language script). Once the complete C++ programming language code is generated, the C++ programming language compiler of the code generator transforms the C++ programming language code into an executable. Because the vectorized operations are implemented using intrinsics, the C++ programming language compiler translates the vectorized operations into the architecture-appropriate SIMD instructions for vector processing.

Figure 5:
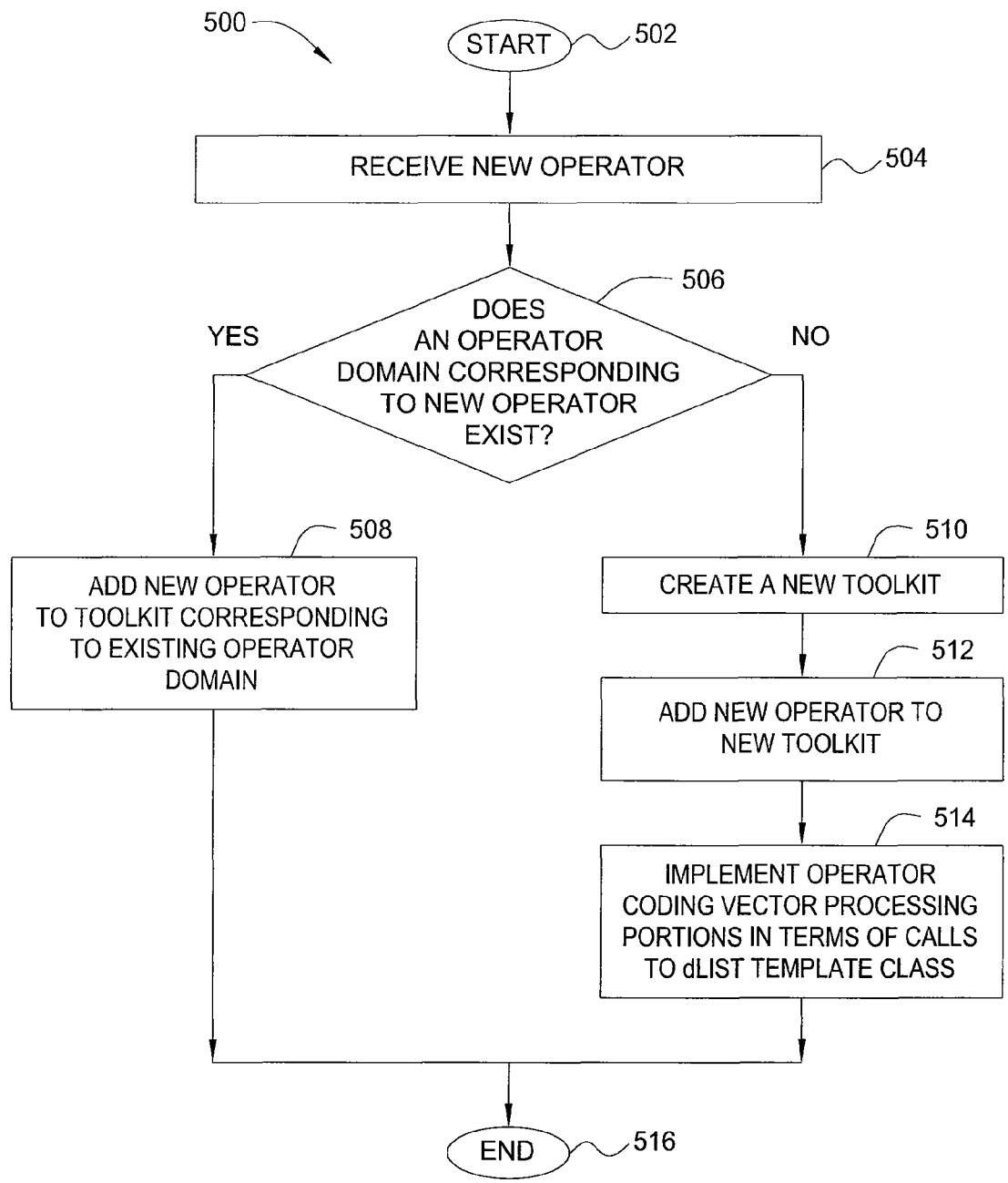
FIG. 5 is a flow diagram illustrating one embodiment of a method for adding new operators to the high-level programming language illustrated in FIG. 2, according to the present invention.

FIG. 5 is a flow diagram illustrating one embodiment of a method 500 for adding new operators to the high-level programming language illustrated in FIG. 2, according to the present invention.

The method 500 is initialized at step 502 and proceeds to step 504, where the method 500 receives a new operator for addition to the high-level programming language. The method 500 then proceeds to step 506 and determines whether an operator domain corresponding to the new operator exists.

If the method 500 concludes in step 506 that an operator domain corresponding to the new operator does exist, the method 500 proceeds to step 508 and adds the new operator to a toolkit corresponding to the existing operator domain before terminating in step 516.

Alternatively, if the method 500 concludes in step 506 that an operator domain corresponding to the new operator does not exist, the method 500 proceeds to step 510 and creates a new toolkit. The method 500 then adds the new operator to the new toolkit in step 512.

In step 514, the method 500 implements operator coding vector processing portions in terms of calls to the dlist template class before terminating in step 516.

Figure 6:
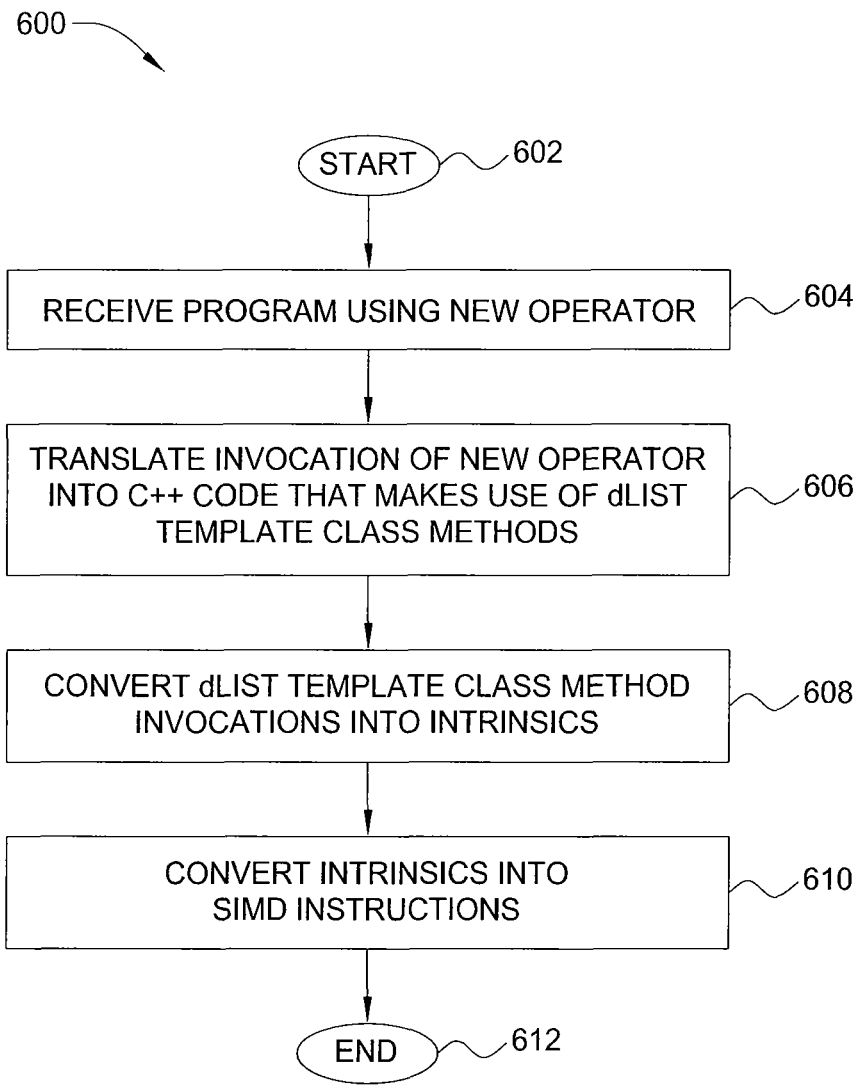
FIG. 6 is a flow diagram illustrating one embodiment of a method for converting code for the second programming tier into vectorized code, according to the present invention.

FIG. 6 is a flow diagram illustrating one embodiment of a method 600 for converting code for the second programming tier into vectorized code, according to the present invention.

The method 600 is initialized at step 602 and proceeds to step 604, where the method 600 receives a program using a new operator. The method 600 then proceeds to step 606 and translates the invocation of the new operator into C++ programming language code that makes use of dlist template class methods.

In step 608, the method 600 converts the dlist template class method invocations into intrinsic. The method 600 then converts the intrinsic into SIMD instructions in step 610 before terminating in step 612.

Figure 7:
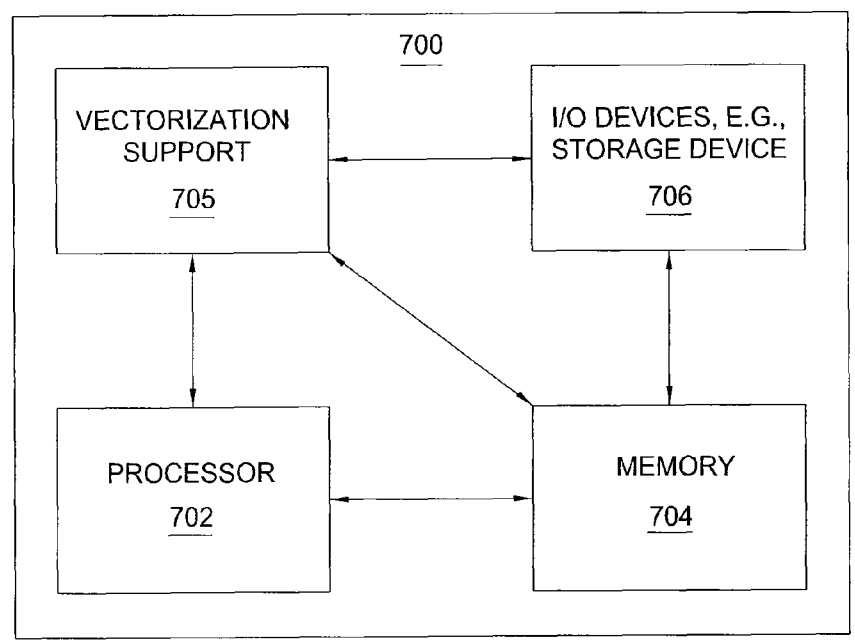
FIG. 7 is a high-level block diagram of the vectorization support method that is implemented using a general purpose computing device.

FIG. 7 is a high-level block diagram of the vectorization support method that is implemented using a general purpose computing device 700. In one embodiment, a general purpose computing device 700 comprises a processor 702, a memory 704, a vectorization support module 705 and various input/output (I/O) devices 706 such as a display, a keyboard, a mouse, a stylus, a wireless network access card, and the like. In one embodiment, at least one I/O device is a storage device (e.g., a disk drive, an optical disk drive, a floppy disk drive). It should be understood that the vectorization support module 705 can be implemented as a physical device or subsystem that is coupled to a processor through a communication channel.

Alternatively, the vectorization support module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Thus, in one embodiment, the vectorization support module 705 for transparent use of vectorization instruction sets, as described herein with reference to the preceding figures can be stored on a computer readable storage medium or carrier (e.g., RAM, magnetic or optical drive or diskette, and the like).

The present invention thus provides less sophisticated application developers with transparent vectorization through accessible vector manipulation language support. Moreover, many applications can benefit from native vectorization through code generation, while considerably reducing the burden on the programmer by making the use of the vectorization extensions transparent.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for generating vector instructions, the method comprising:

receiving, by a first compiler, source code written in a high-level programming language, wherein the source code comprises at least one high-level instruction that performs multiple operations on a plurality of vector operands;

compiling, by the first compiler, the at least one high-level instruction into one or more instructions in an intermediate-level programming language that converts operands into objects of a vector manipulation template class and converts operations into method invocations of the vector manipulation template class; and compiling, by a second compiler, the one or more instructions in the intermediate-level programming language into one or more low-level instructions, wherein the one or more low-level instructions are in an instruction set of a runtime computer architecture, and wherein the compiling the one or more instructions in the intermediate-level programming language comprises selecting a version of the vector manipulation template class that implements vector intrinsics that are specific to the runtime computer architecture, and wherein the first compiler and the second compiler execute on a single computer system.

2. The method of claim 1, wherein the high-level programming language makes use of one or more single instruction, multiple data (SIMD) vectorization instructions used by one or more vector manipulation methods that are part of the vector manipulation template class.

3. The method of claim 2, wherein the one or more vector manipulation methods are implemented in terms of one or more of the vector intrinsics.

4. The method of claim 1, wherein the compiling the one or more instructions in the intermediate-level programming language into one or more low-level instructions is performed in accordance with one or more templates for an operator that carries out one or more vector manipulation steps in accordance with the low-level instructions.

5. The method of claim 1, wherein the intermediate-level instructions are generated in the C++ programming language.

6. The method of claim 5, wherein the compiling the at least one high-level instruction into one or more instructions in the intermediate-level programming language comprises: translating an invocation of an operator in the high-level programming language into C++ programming language code that makes use of one or more methods associated with the vector manipulation template class, where the operator carries out one or more vector manipulation steps.

7. The method of claim 6, wherein the one or more low-level instructions employ one or more single instruction, multiple data (SIMD) instructions.

8. The method of claim 1, wherein the one or more low-level instructions are used in a data stream processing application.

9. An apparatus comprising a non-transitory computer readable storage medium containing an executable program for generating vector instructions, where the program performs the steps of:

receiving, by a first compiler, source code written in a high-level programming language, wherein the source code comprises at least one high-level instruction that performs multiple operations on a plurality of vector operands;

compiling, by the first compiler, the at least one high-level instruction into one or more instructions in an intermediate-level programming language that converts operands into objects of a vector manipulation template class and converts operations into method invocations of the vector manipulation template class; and compiling, by a second compiler, the one or more instructions in the intermediate-level programming language into one or more low-level instructions, wherein the one or more low-level instructions are in an instruction set of a runtime computer architecture, and wherein the compiling the one or more instructions in the intermediate-level programming language comprises selecting a version of the vector manipulation template class that implements vector intrinsics that are specific to the runtime computer architecture, and wherein the first compiler and the second compiler execute on a single computer system.

10. The non-transitory computer readable storage medium of claim 9, wherein the high-level programming language makes use of one or more single instruction, multiple data (SIMD) vectorization instructions used by one or more vector manipulation methods that are part of the vector manipulation template class.

11. The non-transitory computer readable storage medium of claim 10, wherein the one or more vector manipulation methods are implemented in terms of one or more of the vector intrinsics.

12. The non-transitory computer readable storage medium of claim 9, wherein the compiling the one or more instructions in the intermediate-level programming language into one or more low-level instructions is performed in accordance with one or more templates for an operator that carries out one or more vector manipulation steps in accordance with the low-level instructions.

13. The non-transitory computer readable storage medium of claim 9, wherein the intermediate-level instructions are generated in the C++ programming language.

14. The non-transitory computer readable storage medium of claim 13, wherein the compiling the at least one high-level instruction into one or more instructions in the intermediate-level programming language comprises:

translating an invocation of an operator in the high-level programming language into C++ programming language code that makes use of one or more methods associated with the vector manipulation template class, where the operator carries out one or more vector manipulation steps.

15. The non-transitory computer readable storage medium of claim 14, wherein the one or more low-level instructions employ one or more single instruction, multiple data (SIMD) instructions.

16. The non-transitory computer readable storage medium of claim 9, wherein the one or more low-level instructions are used in a data stream processing application.

17. A code generator for generating a set of vector instructions, the code generator comprising:

a memory for storing source code written in a high-level programming language, wherein the source code comprises at least one high-level instruction that performs multiple operations on a plurality of vector operands;

a first compiler for compiling the at least one high-level instruction into one or more instructions in an intermediate-level programming language that converts operands into objects of a vector manipulation template class and converts operations into method invocations of the vector manipulation template class; and a second compiler for compiling the one or more instructions in the intermediate-level programming language into one or more low-level instructions, wherein the one or more low-level instructions are in an instruction set of a runtime computer architecture, and wherein the compiling the one or more instructions in the intermediate-level programming language comprises selecting a version of the vector manipulation template class that implements vector intrinsics that are specific to the runtime computer architecture, wherein the memory, the first compiler, and the second compiler are part of the same code generator.

18. The method of claim 1, wherein the vector manipulation template class is a low-level library-supported template class.

19. The method of claim 18, wherein the vector manipulation template class is a dlist template class.

20. The method of claim 19, wherein the compiling the one or more instructions in the intermediate-level programming language into one or more low-level instructions employs a specific implementation of the dlist class based on the specific computer architecture.

21. The method of claim 19, wherein the dlist class is a regular implementation of the dlist class.

22. The method of claim 19, wherein the dlist class is a vectorized implementation of the dlist class.

23. The method of claim 19, wherein the source code comprises a processing graph including a plurality of operators connected to a plurality of source edge adapters and a plurality of sink edge adapters, at least some of the plurality of operators operating on vector operands, such that the compiling the at least one high-level instruction into one or more instructions in an intermediate-level programming language comprises translating the at least some of the plurality of operators into invocations of methods of the dlist template class.

24. The method of claim 23, wherein at least one of the at least some of the plurality of operators is implemented in a non-vectorized form to safeguard against an incomplete vectorized instruction set.

25. The method of claim 1, wherein the compiling by the first compiler and the compiling by the second compiler are both performed under instructions from the same user.

* * * * *